(12) United States Patent
Li et al.

(10) Patent No.: US 10,536,227 B2
(45) Date of Patent: Jan. 14, 2020

(54) ACTIVE ANTENNA DEVICE AND TEST METHOD THEREFOR

(71) Applicant: China Academy of Telecommunications Technology, Beijing (CN)

(72) Inventors: Chuanjun Li, Beijing (CN); Xin Su, Beijing (CN); Yuexia Song, Beijing (CN); Shouning Jiang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 43 days.

(21) Appl. No.: 16/060,263

(22) PCT Filed: Nov. 22, 2016

(86) PCT No.: PCT/CN2016/106811
§ 371 (c)(1),
(2) Date: Jun. 7, 2018

(87) PCT Pub. No.: WO2017/097107
PCT Pub. Date: Jun. 15, 2017

(65) Prior Publication Data
US 2018/0367225 A1 Dec. 20, 2018

(30) Foreign Application Priority Data

Dec. 10, 2015 (CN) .......................... 2015 1 0917456

(51) Int. Cl.
*G01R 29/10* (2006.01)
*H04B 17/12* (2015.01)
(Continued)

(52) U.S. Cl.
CPC ............. *H04B 17/12* (2015.01); *H04B 17/17* (2015.01); *H04B 17/21* (2015.01); *H04B 17/29* (2015.01);
(Continued)

(58) Field of Classification Search
CPC ............ H01Q 5/335; H01Q 5/50; H01Q 1/24
See application file for complete search history.

(56) References Cited

U.S. PATENT DOCUMENTS 8,749,430 B2 * 6/2014 Shinonaga ............... H01Q 3/36
342/157
2012/0327856 A1 12/2012 Jung et al.
(Continued)

FOREIGN PATENT DOCUMENTS

CN 101651480 A 2/2010
CN 102377027 A 3/2012
(Continued)

*Primary Examiner* — Binh B Tran
(74) *Attorney, Agent, or Firm* — Foley & Lardner LLP

(57) ABSTRACT

Disclosed are an active antenna device and a test method therefor, for resolving the problem that existing large-scale active antennae cannot be tested by using a traditional test method due to no traditional antenna connectors. The active antenna device comprises: a transceiver array, a radio frequency calibration and test distribution network unit, an antenna passive distribution network unit, an antenna array, and S test connectors, wherein the radio frequency calibration and test distribution network unit is connected to the transceiver array through N data channels and M calibration channels respectively and is connected to the test connectors, and the antenna passive distribution network unit is connected to the radio frequency calibration and test distribution network unit through N data channels and is connected to the antenna array through P data channels, N being a positive integer greater than or equal to 1, M being a positive integer greater than or equal to 1, P being a positive (Continued)

integer greater than or equal to 1, and S being a positive integer greater than or equal to 1.

25 Claims, 4 Drawing Sheets

(51) Int. Cl.

| | | |
|---|---|---|
| *H04B 17/21* | (2015.01) | |
| *H04B 17/29* | (2015.01) | |
| *H04B 17/17* | (2015.01) | |
| *H01Q 5/335* | (2015.01) | |
| *H01Q 5/50* | (2015.01) | |
| *H01Q 1/24* | (2006.01) | |

(52) U.S. Cl.
CPC ............... *H01Q 1/24* (2013.01); *H01Q 5/335* (2015.01); *H01Q 5/50* (2015.01)

(56) References Cited

U.S. PATENT DOCUMENTS

| | | |
|---|---|---|
| 2013/0058280 A1 | 3/2013 | Kim et al. |
| 2013/0141287 A1 | 6/2013 | Pallonen |

FOREIGN PATENT DOCUMENTS

| | | |
|---|---|---|
| CN | 102571175 A | 7/2012 |
| CN | 103338084 A | 10/2013 |
| CN | 203387519 A | 1/2014 |
| CN | 103997352 A | 8/2014 |
| CN | 104753612 A | 7/2015 |
| EP | 2 424 035 A1 | 2/2012 |
| WO | WO-2010/044620 A2 | 4/2010 |
| WO | WO2011131255 | 10/2011 |
| WO | WO 2015/106802 | 7/2015 |

\* cited by examiner

ACTIVE ANTENNA DEVICE AND TEST METHOD THEREFOR

This application is a US National Stage of International Application No. PCT/CN2016/106811, filed on Nov. 22, 2016, designating the United States, and claiming the benefit of Chinese Patent Application No. 201510917456.9, filed with the Chinese Patent Office on Dec. 10, 2015, and entitled "Active antenna device and method for testing the same", which is hereby incorporated by reference in its entirety.

FIELD

The present invention relates to the field of communications, and particularly to an active antenna device and a method for testing the same.

BACKGROUND

Since the Multiple Input Multiple Output (MIMO) technologies are important to an improvement of a peak rate and a system spectrum utilization ratio, all the radio access technology standards of Long Term Evolution (LTE), LTE-Advanced (LTE-A), etc., have been built based upon the MIMO and Orthogonal Frequency Division Multiplexing (OFDM) technologies. A gain performance of the MIMO technologies arises from a space freedom available in a multi-antenna system, since faster data transmission can be achieved using the space freedom, so one of the most important evolvements of the MIMO technologies being standardized is an extension of dimensions.

In order to further improve the gain performance of the MIMO technologies, the technologies of a large-scale antenna array have been introduced to a mobile communication system. The large-scale antenna array includes up to 128 antenna elements and up to 128 transceivers, or up to 256 antenna elements and up to 256 transceivers, or up to 512 antenna elements and up to 512 transceivers. If the large-scale antenna array is traditionally arranged as Radio Remote Units (RRUs) and passive antennas, and each antenna element is connected with a transceiver, then 128, 256, or 512 radio frequency cables will be necessitated, but it may be rather difficult to engineer such a large number of radio frequency cables, and too difficult to guarantee their reliability, so active antennas are typically arranged in the large-scale antenna array, which is referred to as a large-scale active antenna array.

For the large-scale active antennas, the antenna array is typically integrated with the RRU functions, and provided without any traditional antenna connectors, so the traditional radiation test method can not be used for testing.

SUMMARY

Embodiments of the invention provide an active antenna device and a method for testing the same so as to address the problem that existing large-scale active antenna array without any traditional antenna connectors can not be traditionally tested.

Specific technical solutions according to the embodiments of the invention are as follows.

An embodiment of the invention provides an active antenna device including:

a transceiver array, a radio frequency calibration and test distribution network unit, an antenna passive distribution network unit, an antenna array, and test connectors, wherein the radio frequency calibration and test distribution network unit is connected with the transceiver array through N data channels and M calibration channels, and connected with the test connectors; the antenna passive distribution network unit is connected with the radio frequency calibration and test distribution network unit through N data channels, and connected with the antenna array through P data channels; wherein N is a positive integer more than or equal to 1, M is a positive integer more than or equal to 1, P is a positive integer more than or equal to 1, and S is a positive integer more than or equal to 1;

the transceiver array converts a received optical radio frequency transmission test signal into N branches of electric radio frequency transmission test signals, amplifies and then filters the N branches of electric radio frequency transmission test signals respectively, and transmits the electric radio frequency transmission test signals to the radio frequency calibration and test distribution network unit through the N data channels based upon the filtered N branches of electric radio frequency transmission test signals; and the radio frequency calibration and test distribution network unit receives the electric radio frequency transmission test signals transmitted by the transceiver array through the N data channels, directionally couples, integrates, and distributes the electric radio frequency transmission test signals into Q branches of electric radio frequency transmission test signals, and outputs S branches of electric radio frequency transmission test signals among the Q branches of electric radio frequency transmission test signals to the test connectors, wherein Q is equal to the sum of M and S;

or, the radio frequency calibration and test distribution network unit receives the S branches of electric radio frequency reception test signals through the test connectors, splits and directionally couples the S branches of electric radio frequency reception test signals into N branches of electric radio frequency reception test signals, and transmits the electric radio frequency reception test signals to the transceiver array through the N data channels based upon the N branches of electric radio frequency reception test signals; and the transceiver array receives the electric radio frequency reception test signals through the N data channels, filters and then amplifies the electric radio frequency reception test signals, converts the amplified electric radio frequency reception test signals into an optical radio frequency reception test signal, and transmits the optical radio frequency reception test signal through an optic fiber.

In a possible implementation, the radio frequency calibration and test distribution network unit includes N directional couplers, N loads, and more than one power distributor and synthesizer, and the N directional couplers and the N loads are connected through the power distributor and synthesizers.

In a possible implementation, a quantity of power distributor and synthesizers in the radio frequency calibration and test distribution network unit is $$\sum_{i=1}^{K1} \frac{(2^i)}{2} + \sum_{i=1}^{K2} \frac{(2^i)}{2},$$

wherein $K1=\log_2(N)$, $K2=\log_2(M+S)$, N is a power of 2, and (M+S) is a power of 2.

In a possible implementation, the transceiver array is configured: to select one of the filtered N branches of electric radio frequency transmission test signals, and to transmit the selected one branch of electric radio frequency transmission test signal to the radio frequency calibration and test distribution network unit through corresponding one of the data channels; and the radio frequency calibration and test distribution network unit is configured: to receive the electric radio frequency transmission test signals transmitted by the transceiver array through the one data channel, to directionally couple, integrate, and distribute the one branch of electric radio frequency transmission test signals into the Q branches of electric radio frequency transmission test signals, and to transmit the S branches of electric radio frequency transmission test signals among the Q branches of electric radio frequency transmission test signals to the test connectors;

or, the transceiver array is configured: to transmit the filtered N branches of electric radio frequency transmission test signals to the radio frequency calibration and test distribution network unit through the N data channels; and the radio frequency calibration and test distribution network unit is configured: to receive the N branches of electric radio frequency transmission test signals transmitted by the transceiver array through the N data channels, to directionally couple, integrate, and distribute the N branches of electric radio frequency transmission test signals into the Q branches of electric radio frequency transmission test signals, and to transmit the S branches of electric radio frequency transmission test signals among the Q branches of electric radio frequency transmission test signals to the test connectors.

In a possible implementation, the transceiver array is configured:

to select one of the received N branches of electric radio frequency reception test signals, to filter and then amplify the received one branch of electric radio frequency reception test signals, to convert the amplified one branch of electric radio frequency reception test signals into the optical radio frequency reception test signal, and to transmit the optical radio frequency reception test signal through the optic fiber;

or to receive the N branches of electric radio frequency reception test signals, to filter and then amplify the N branches of electric radio frequency reception test signals respectively, to convert the amplified N branches of electric radio frequency reception test signals into the optical radio frequency reception test signal, and to transmit the optical radio frequency reception test signal through the optic fiber.

In a possible implementation, the transceiver array is further configured:

to convert a received optical radio frequency transmission data signal into N branches of electric radio frequency transmission data signals, to amplify and then filter the N branches of electric radio frequency transmission data signals respectively, and to transmit the filtered N branches of electric radio frequency transmission data signals to the radio frequency calibration and test distribution network unit through the N data channels;

the radio frequency calibration and test distribution network unit is further configured:

to receive the N branches of electric radio frequency transmission data signals transmitted by the transceiver array through the N data channels, and to transmit the N branches of electric radio frequency transmission data signals to the antenna passive distribution network unit; and the antenna passive distribution network unit is configured:

to receive the N branches of electric radio frequency transmission data signals transmitted by the radio frequency calibration and test distribution network unit, to convert the N branches of electric radio frequency transmission data signals into P branches of electric radio frequency transmission data signals, and to output the P branches of electric radio frequency transmission data signals to the antenna array.

In a possible implementation, the antenna passive distribution network unit is configured:

to receive P branches of electric radio frequency reception data signals transmitted by the antenna array, to convert the P branches of electric radio frequency reception data signals into N branches of electric radio frequency reception data signals, and to output the N branches of electric radio frequency reception data signals to the radio frequency calibration and test distribution network unit;

the radio frequency calibration and test distribution network unit is further configured:

to receive the N branches of electric radio frequency reception data signals transmitted by the antenna passive distribution network unit, and to output the N branches of electric radio frequency reception data signals to the transceiver array through the N data channels; and the transceiver array is further configured:

to receive the N branches of electric radio frequency reception data signals transmitted by the radio frequency calibration and test distribution network unit through the N data channels, to filter and then amplify the N branches of electric radio frequency reception data signals respectively, to convert the amplified N branches of electric radio frequency reception data signals into an optical radio frequency reception data signal, and to transmit the optical radio frequency reception data signal through the optic fiber.

In a possible implementation, the transceiver array is further configured:

to convert the received optical radio frequency transmission calibration signal into N branches of electric radio frequency transmission calibration signals, to amplify and then filter the N branches of electric radio frequency transmission calibration signals respectively, and to output the filtered N branches of electric radio frequency transmission calibration signals to the radio frequency calibration and test distribution network unit;

the radio frequency calibration and test distribution network unit is further configured:

to receive the N branches of electric radio frequency transmission calibration signals transmitted by the transceiver array through the N data channels, to directionally couple, integrate, and distribute them into Q branches of electric radio frequency transmission calibration signals, to transmit M branches of electric radio frequency transmission calibration signals among the Q branches of electric radio frequency transmission calibration signals to the transceiver array through the M calibration channels, and to output S branches of electric radio frequency transmission calibration signals other than the M branches of electric radio frequency transmission calibration signals among the Q branches of electric radio frequency transmission calibration signals to the test connectors; and the transceiver array is further configured:

to select one of the M calibration channels as a primary calibration receiving channel, to receive the electric radio frequency transmission calibration signals transmitted by the radio frequency calibration and test distribution network unit through the primary calibration receiving channel, to amplify and then convert the electric radio frequency transmission calibration signal into an optical radio frequency transmission calibration signal, and to transmit the optical radio frequency transmission calibration signal obtained as a result of conversion through the optic fiber.

In a possible implementation, the transceiver array is further configured:

to convert a received optical radio frequency reception calibration signal into a branch of electric radio frequency reception calibration signal, to select one of the M calibration channels as a primary calibration transmitting channel, and to amplify the electric radio frequency reception calibration signal, and then transmit the electric radio frequency reception calibration signal to the radio frequency calibration and test distribution network unit through the primary calibration transmitting channel;

the radio frequency calibration and test distribution network unit is further configured:

to receive the electric radio frequency reception calibration signal transmitted by the transceiver array, to split and directly couple the electric radio frequency reception test signal into N branches of electric radio frequency reception calibration signals, and to transmit the N branches of electric radio frequency reception calibration signals to the transceiver array through the N data channels; and the transceiver array is further configured:

to receive the N branches of electric radio frequency reception calibration signals transmitted by the radio frequency calibration and test distribution network unit through the N data channels, to filter and then amplify the N branches of electric radio frequency reception calibration signals respectively, to convert the amplified N branches of electric radio frequency reception calibration signals into an optical radio frequency reception calibration signal, and to transmit the optical radio frequency reception calibration signal obtained as a result of conversion through the optic fiber.

In a possible implementation, the antenna passive distribution network unit is a passive distribution network with constant amplitude, or a phase shift distribution network.

In a possible implementation, the antenna array is formed by arranging uni-polarized antenna elements or dually-polarized antenna elements in a preset array structure.

In a possible implementation, the test connectors are connected with matching impedances in a non-test state, and connected with test devices in a test state.

An embodiment of the invention provides a method for testing an active antenna device, the method including:

converting, by the active antenna device through a transceiver array, a received optical radio frequency transmission test signal into N branches of electric radio frequency transmission test signals, amplifying and then filtering the N branches of electric radio frequency transmission test signals respectively, and transmitting the electric radio frequency transmission test signals to a radio frequency calibration and test distribution network unit through N data channels based upon the filtered N branches of electric radio frequency transmission test signals; and receiving, by the active antenna device through the radio frequency calibration and test distribution network unit, the electric radio frequency transmission test signals transmitted by the transceiver array through the N data channels, directionally coupling, integrating, and distributing the electric radio frequency transmission test signals into Q branches of electric radio frequency transmission test signals, and outputting S branches of electric radio frequency transmission test signals among the Q branches of electric radio frequency transmission test signals to test connectors, wherein Q is equal to a sum of M and S;

or, receiving, by the active antenna device, S branches of electric radio frequency reception test signals through test connectors; splitting and directionally coupling, by the active antenna device through a radio frequency calibration and test distribution network unit, the S branches of electric radio frequency reception test signals received through the test connectors into N branches of electric radio frequency reception test signals, and transmitting the electric radio frequency reception test signals to a transceiver array through N data channels based upon the N branches of electric radio frequency reception test signals; and receiving, by the active antenna device through the transceiver array, the electric radio frequency reception test signals, filtering and then amplifying the electric radio frequency reception test signals, converting the amplified electric radio frequency reception test signals into an optical radio frequency reception test signal, and transmitting the optical radio frequency reception test signal through an optic fiber.

In a possible implementation, the radio frequency calibration and test distribution network unit includes N directional couplers, N loads, and more than one power distributor and synthesizer, and the N directional couplers and the N loads are connected through the power distributor and synthesizers.

In a possible implementation, a quantity of power distributor and synthesizers in the radio frequency calibration and test distribution network unit is $$\sum_{i=1}^{K1} \frac{(2^i)}{2} + \sum_{i=1}^{K2} \frac{(2^i)}{2},$$

wherein $K1=\log_2(N)$, $K2=\log_2(M+S)$, N is a power of 2, and (M+S) is a power of 2.

In a possible implementation, the transmitting the electric radio frequency transmission test signals to the radio frequency calibration and test distribution network unit through the N data channels based upon the filtered N branches of electric radio frequency transmission test signals includes: selecting one of the filtered N branches of electric radio frequency transmission test signals, and transmitting the selected one branch of electric radio frequency transmission test signal to the radio frequency calibration and test distribution network unit through corresponding one of the data channels.

The receiving, by the radio frequency calibration and test distribution network unit, the electric radio frequency transmission test signals transmitted by the transceiver array through the N data channels, directionally coupling, integrating, and distributing the electric radio frequency transmission test signals into the Q branches of electric radio frequency transmission test signals, and outputting the S branches of electric radio frequency transmission test signals among the Q branches of electric radio frequency transmission test signals to the test connectors includes: receiving, by the radio frequency calibration and test distribution network unit, the electric radio frequency transmission test signal transmitted by the transceiver array through the one data channel, directionally coupling, integrating, and distributing the one branch of electric radio frequency transmission test signal into the Q branches of electric radio frequency transmission test signals, and transmitting the S branches of electric radio frequency transmission test signals among the Q branches of electric radio frequency transmission test signals to the test connectors.

In a possible implementation, the transmitting the electric radio frequency transmission test signals to the radio frequency calibration and test distribution network unit through the N data channels based upon the filtered N branches of electric radio frequency transmission test signals includes: transmitting the filtered N branches of electric radio frequency transmission test signals to the radio frequency calibration and test distribution network unit through the N data channels.

The receiving, by the radio frequency calibration and test distribution network unit, the electric radio frequency transmission test signals transmitted by the transceiver array through the N data channels, directionally coupling, integrating, and distributing the electric radio frequency transmission test signals into the Q branches of electric radio frequency transmission test signals, and outputting the S branches of electric radio frequency transmission test signals among the Q branches of electric radio frequency transmission test signals to the test connectors includes:

receiving the N branches of electric radio frequency transmission test signals transmitted by the transceiver array through the N data channels, directionally coupling, integrating, and distributing the N branches of electric radio frequency transmission test signals into the Q branches of electric radio frequency transmission test signals, and transmitting the S branches of electric radio frequency transmission test signals among the Q branches of electric radio frequency transmission test signals to the test connectors.

In a possible implementation, the transmitting the electric radio frequency transmission test signals to the radio frequency calibration and test distribution network unit through the N data channels based upon the filtered N branches of electric radio frequency transmission test signals includes:

selecting one of the received N branches of electric radio frequency reception test signals, filtering and then amplifying the one received electric radio frequency reception test signal, converting the amplified one branch of electric radio frequency reception test signals into the optical radio frequency reception test signal, and transmitting the optical radio frequency reception test signal through the optic fiber; or receiving the N branches of electric radio frequency reception test signals, filtering and then amplifying the N branches of electric radio frequency reception test signals respectively, converting the amplified N branches of electric radio frequency reception test signals into the optical radio frequency reception test signal, and transmitting the optical radio frequency reception test signal through the optic fiber.

In a possible implementation, converting, by the active antenna device through the transceiver array, a received optical radio frequency transmission data signal into N branches of electric radio frequency transmission data signals, amplifying and then filtering the N branches of electric radio frequency transmission data signals respectively, and transmitting the filtered N branches of electric radio frequency transmission data signals to the radio frequency calibration and test distribution network unit through the N data channels; receiving, by the radio frequency calibration and test distribution network unit, the N branches of electric radio frequency transmission data signals transmitted by the transceiver array through the N data channels, and transmitting the N branches of electric radio frequency transmission data signals to the antenna passive distribution network unit; and receiving, by the active antenna device through the antenna passive distribution network unit, the N branches of electric radio frequency transmission data signals transmitted by the radio frequency calibration and test distribution network unit, converting the N branches of electric radio frequency transmission data signals into P branches of electric radio frequency transmission data signals, and outputting the P branches of electric radio frequency transmission data signals to the antenna array.

In a possible implementation, receiving, by the active antenna device through the antenna passive distribution network unit, P branches of electric radio frequency reception data signals transmitted by the antenna array, converting the P branches of electric radio frequency reception data signals into N branches of electric radio frequency reception data signals, and outputting the N branches of electric radio frequency reception data signals to the radio frequency calibration and test distribution network unit; receiving, by the active antenna device through the radio frequency calibration and test distribution network unit, the N branches of electric radio frequency reception data signals transmitted by the antenna passive distribution network unit, and outputting the N branches of electric radio frequency reception data signals to the transceiver array through the N data channels; and receiving, by the transceiver array, the N branches of electric radio frequency reception data signals transmitted by the radio frequency calibration and test distribution network unit through the N data channels, filtering and then amplifying the N branches of electric radio frequency reception data signals respectively, converting the amplified N branches of electric radio frequency reception data signals into an optical radio frequency reception data signal, and transmitting the optical radio frequency reception data signal through the optic fiber.

In a possible implementation, converting, by the active antenna device through the transceiver array, the received optical radio frequency transmission calibration signal into N branches of electric radio frequency transmission calibration signals, amplifying and then filtering the N branches of electric radio frequency transmission calibration signals respectively, and outputting the filtered N branches of electric radio frequency transmission calibration signals to the radio frequency calibration and test distribution network unit; receiving, by the radio frequency calibration and test distribution network unit, the N branches of electric radio frequency transmission calibration signals transmitted by the transceiver array through the N data channels, directionally coupling, integrating, and distributing them into Q branches of electric radio frequency transmission calibration signals, transmitting M branches of electric radio frequency transmission calibration signals among the Q branches of electric radio frequency transmission calibration signals to the transceiver array through the M calibration channels, and outputting S branches of electric radio frequency transmission calibration signals other than the M branches of electric radio frequency transmission calibration signals among the Q branches of electric radio frequency transmission calibration signals to the test connectors; and selecting, by the active antenna device through the transceiver array, one of the M calibration channels as a primary calibration receiving channel, receiving the electric radio frequency transmission calibration signals transmitted by the radio frequency calibration and test distribution network unit through the primary calibration receiving channel, amplifying and then converting the electric radio frequency transmission calibration signal into an optical radio frequency transmission calibration signal, and transmitting the optical radio frequency transmission calibration signal obtained as a result of conversion through the optic fiber.

In a possible implementation, converting, by the active antenna device through the transceiver array, a received optical radio frequency reception calibration signal into a branch of electric radio frequency reception calibration signal, selecting one of the M calibration channels as a primary calibration transmitting channel, amplifying the electric radio frequency reception calibration signal, and then transmitting the electric radio frequency reception calibration signal to the radio frequency calibration and test distribution network unit through the primary calibration transmitting channel; receiving, by the active antenna device through the radio frequency calibration and test distribution network unit, the electric radio frequency reception calibration signal transmitted by the transceiver array, splitting and directionally coupling the electric radio frequency reception test signal into N branches of electric radio frequency reception calibration signals, and transmitting the N branches of electric radio frequency reception calibration signals to the transceiver array through the N data channels; and receiving, by the active antenna device through the transceiver array, the N branches of electric radio frequency reception calibration signals transmitted by the radio frequency calibration and test distribution network unit through the N data channels, filtering and then amplifying the N branches of electric radio frequency reception calibration signals respectively, converting the amplified N branches of electric radio frequency reception calibration signals into an optical radio frequency reception calibration signal, and transmitting the optical radio frequency reception calibration signal obtained as a result of conversion through the optic fiber.

In a possible implementation, the antenna passive distribution network unit is a passive distribution network with constant amplitude, or a phase shift distribution network.

In a possible implementation, the antenna array is formed by arranging uni-polarized antenna elements or dually-polarized antenna elements in a preset array structure.

In a possible implementation, the test connectors are connected with matching impedances in a non-test state, and connected with test devices in a test state.

With the technical solutions above, in the embodiments of the invention, the calibration channels are provided in the active antenna device through the transceiver array, the radio frequency calibration and test distribution network unit, the antenna passive distribution network unit, the antenna array, and the test connectors to thereby address the problem in the prior art that the large-scale active antenna array without any traditional antenna connectors can not be traditionally tested, so as to test the active antenna device without being limited to any test field.

DETAILED DESCRIPTION OF THE EMBODIMENTS

In order to make the objects, technical solutions, and advantages of the embodiments of the invention more apparent, the invention will be described below in further details with reference to the drawings, and apparently the embodiments described below are only a part but not all of the embodiments of the invention. Based upon the embodiments here of the invention, all the other embodiments which can occur to those skilled in the art without any inventive effort shall fall into the scope of the invention.

Figure 1:
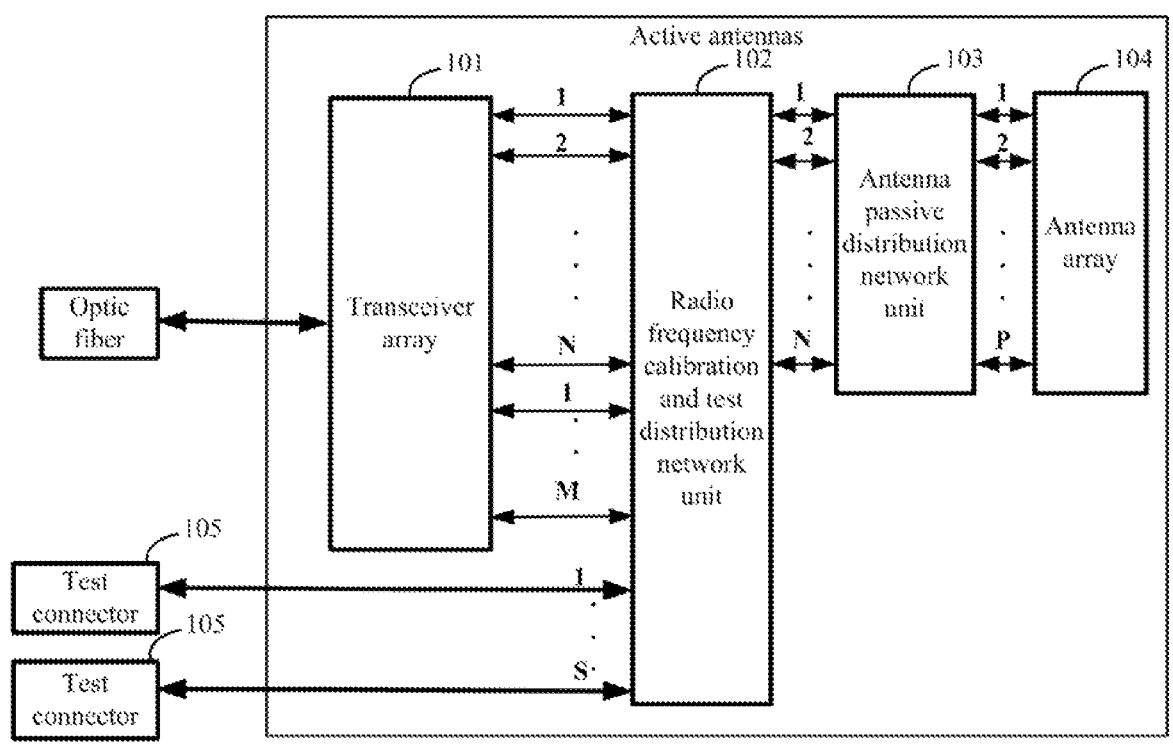
FIG. 1 is a schematic structural diagram of an active antenna device according to an embodiment of the invention.

In an embodiment of the invention, as illustrated in FIG. 1, an active antenna device includes a transceiver array 101, a radio frequency calibration and test distribution network unit 102, an antenna passive distribution network unit 103, an antenna array 104, and S test connectors 105.

Here the radio frequency calibration and test distribution network unit 102 is connected with the transceiver array 101 respectively through N data channels and M calibration channels, and connected with the test connectors 105.

Here the antenna passive distribution network unit 103 is connected with the radio frequency calibration and test distribution network unit 102 through N data channels, and connected with the antenna array 104 through P data channels.

Here N is a positive integer more than or equal to 1, M is a positive integer more than or equal to 1, P is a positive integer more than or equal to 1, and S is a positive integer more than or equal to 1.

Here the transceiver array 101 is provided with functions of transmitting and receiving a data signal, functions of transmitting and receiving a transmission calibration signal, functions of transmitting and receiving a reception calibration signal, functions of transmitting and receiving a test signal for a conductivity test on characteristics of a transmitter, and functions of transmitting and receiving a test signal for a conductivity test on characteristics of a receiver.

The radio frequency calibration and test distribution network unit 102 is also provided with functions of transmitting, receiving and processing a data signal, functions of transmitting, receiving and processing a transmission calibration signal, functions of transmitting, receiving and processing a reception calibration signal, functions of transmitting, receiving and processing a test signal for a conductivity test on characteristics of a transmitter, and functions of transmitting, receiving and processing a test signal for a conductivity test on characteristics of a receiver.

The antenna passive distribution network unit 103 is provided with functions of transmitting, receiving and processing a data signal.

The antenna array 104 is provided with functions of transmitting, receiving and processing a data signal.

In an implementation, a process of a conductivity test on characteristics of a transmitter is as follows.

The transceiver array 101 converts a received optical radio frequency transmission test signal into N branches of electric radio frequency transmission test signals, amplifies and then filters the N branches of electric radio frequency transmission test signals respectively, and transmits the electric radio frequency transmission test signals to the radio frequency calibration and test distribution network unit 102 through the N data channels based upon the filtered N branches of electric radio frequency transmission test signals. The radio frequency calibration and test distribution network unit 102 receives the electric radio frequency transmission test signals transmitted by the transceiver array 101 through the N data channels, directionally couples, integrates, and distributes the electric radio frequency transmission test signals into Q branches of electric radio frequency transmission test signals, and outputs S branches of electric radio frequency transmission test signals among the Q branches of electric radio frequency transmission test signals to the test connectors 105, where Q is equal to the sum of M and S.

Here in the process of the conductivity test on characteristics of the transmitter, the transceiver array 101 amplifies and then filters power levels of the N branches of electric radio frequency transmission test signals.

In a specific implementation, in the process of a conductivity test on characteristics of a transmitter, the transceiver array 101 selects one of the filtered N branches of electric radio frequency transmission test signals, and transmits the selected one branch of electric radio frequency transmission test signals to the radio frequency calibration and test distribution network unit 102 through a corresponding data channel. The radio frequency calibration and test distribution network unit 102 receives the one branch of electric radio frequency transmission test signals transmitted by the transceiver array 101 through the one data channel, directionally couples, integrates, and distributes the one branch of electric radio frequency transmission test signals into Q branches of electric radio frequency transmission test signals, and outputs S branches of electric radio frequency transmission test signals among the Q branches of electric radio frequency transmission test signals to the test connectors 105.

In another specific implementation, in the process of a conductivity test on characteristics of a transmitter, the transceiver array 101 transmits the filtered N branches of electric radio frequency transmission test signals to the radio frequency calibration and test distribution network unit 102 through the N data channels. The radio frequency calibration and test distribution network unit 102 receives the N branches of electric radio frequency transmission test signals transmitted by the transceiver array 101 through the N data channels, directionally couples, integrates, and distributes the N branches of electric radio frequency transmission test signals into Q branches of electric radio frequency transmission test signals, and outputs S branches of electric radio frequency transmission test signals among the Q branches of electric radio frequency transmission test signals to the test connectors 105.

In an implementation, a process of a conductivity test on characteristics of a receiver is as follows.

The radio frequency calibration and test distribution network unit 102 receives S branches of electric radio frequency reception test signals through the test connectors 105, splits and directionally couples the S branches of electric radio frequency reception test signals into N branches of electric radio frequency reception test signals, and transmits the electric radio frequency reception test signals to the transceiver array 101 through the N data channels based upon the N branches of electric radio frequency reception test signals.

The transceiver array 101 receives the electric radio frequency reception test signals through the N data channels, filters and then amplifies the electric radio frequency reception test signals, converts the amplified electric radio frequency reception test signals into an optical radio frequency reception test signal, and transmits the optical radio frequency reception test signal through an optic fiber.

Here in the process of the conductivity test on characteristics of the receiver, the transceiver array 101 filters the electric radio frequency reception test signals, and then performs low-noise amplification processing on the filtered electric radio frequency reception test signals, and amplifies power levels of the low-noise amplified electric radio frequency reception test signals.

In a specific implementation, in the process of a conductivity test on characteristics of a receiver, the transceiver array 101 selects one of the N branches of electric radio frequency reception test signals transmitted by the radio frequency calibration and test distribution network unit 102, filters and then amplifies the received one branch of electric radio frequency reception test signal, converts the amplified one branch of electric radio frequency reception test signal into an optical radio frequency reception test signal, and transmits the optical radio frequency reception test signal through the optic fiber.

In another specific implementation, in the process of a conductivity test on characteristics of a receiver, the transceiver array 101 receives the N branches of electric radio frequency reception test signals transmitted by the radio frequency calibration and test distribution network unit 102 through the N data channels, filters and then amplifies the N branches of electric radio frequency reception test signals, converts the amplified N branches of electric radio frequency reception test signals into an optical radio frequency reception test signal, and transmits the optical radio frequency reception test signal through the optic fiber.

In an implementation, in a process of transmitting a transmission data signal, the transceiver array 101 converts the received optical radio frequency transmission data signal into N branches of electric radio frequency transmission data signals, amplifies and then filters the N branches of electric radio frequency transmission data signals respectively, and transmits the filtered N branches of electric radio frequency transmission data signals to the radio frequency calibration and test distribution network unit 102 through the N data channels. The radio frequency calibration and test distribution network unit 102 receives the N branches of electric radio frequency transmission data signals transmitted by the transceiver array 101 through the N data channels, and transmits the N branches of electric radio frequency transmission data signals to the antenna passive distribution network unit 103. The antenna passive distribution network unit 103 receives the N branches of electric radio frequency transmission data signals transmitted by the radio frequency calibration and test distribution network unit 102, converts the N branches of electric radio frequency transmission data signals into P branches of electric radio frequency transmission data signals, and outputs the P branches of electric radio frequency transmission data signals to the antenna array 104.

Here in the process of transmitting a transmission data signal, the transceiver array 101 amplifies power levels of the N branches of electric radio frequency transmission data signals respectively.

Here in the process of transmitting a transmission data signal, the radio frequency calibration and test distribution network unit 102 transmits the N branches of electric radio frequency transmission data signals transmitted by the transceiver array 101 to the antenna passive distribution network unit 103 through a straight-through component of a directional coupler.

In an implementation, in a process of transmitting a reception data signal, the antenna passive distribution network unit 103 receives P branches of electric radio frequency reception data signals transmitted by the antenna array 104, converts the P branches of electric radio frequency reception data signals into N branches of electric radio frequency reception data signals, and outputs the N branches of electric radio frequency reception data signals to the radio frequency calibration and test distribution network unit 102. The radio frequency calibration and test distribution network unit 102 receives the N branches of electric radio frequency reception data signals transmitted by the antenna passive distribution network unit 103, and outputs the N branches of electric radio frequency reception data signals to the transceiver array 101 through the N data channels. The transceiver array 101 receives the N branches of electric radio frequency reception data signals transmitted by the radio frequency calibration and test distribution network unit 102 through the N data channels, filters and then amplifies the N branches of electric radio frequency reception data signals respectively, converts the amplified N branches of electric radio frequency reception data signals into an optical radio frequency reception data signal, and transmits the optical radio frequency reception data signal through the optic fiber.

Here the transceiver array 101 filters and then amplifies the N branches of electric radio frequency reception data signals respectively as follows: filtering the N branches of electric radio frequency reception data signals respectively, and then performing low-noise amplification processing on the filtered electric radio frequency reception test signals, and amplifying power levels of the low-noise amplified N branches of electric radio frequency reception test signals respectively.

In an implementation, in a process of transmitting calibration, the transceiver array 101 converts the received optical radio frequency transmission calibration signal into N branches of electric radio frequency transmission calibration signals, amplifies and then filters the N branches of electric radio frequency transmission calibration signals respectively, and outputs the filtered N branches of electric radio frequency transmission calibration signals to the radio frequency calibration and test distribution network unit 102. The radio frequency calibration and test distribution network unit 102 receives the N branches of electric radio frequency transmission calibration signals transmitted by the transceiver array 101 through the N data channels, directionally couples, integrates, and distributes them into Q branches of electric radio frequency transmission calibration signals, transmits M branches of electric radio frequency transmission calibration signals among the Q branches of electric radio frequency transmission calibration signals to the transceiver array 101 through the M calibration channels, and outputs S branches of electric radio frequency transmission calibration signals other than the M branches of electric radio frequency transmission calibration signals among the Q branches of electric radio frequency transmission calibration signals to the test connectors 105. The transceiver array 101 selects one of the M calibration channels as a primary calibration receiving channel, receives the electric radio frequency transmission calibration signals transmitted by the radio frequency calibration and test distribution network unit 102 through the primary calibration receiving channel, amplifies and then converts the electric radio frequency transmission calibration signal into an optical radio frequency transmission calibration signal, and transmits the optical radio frequency transmission calibration signal obtained as a result of conversion through the optic fiber.

Here in the process of transmitting calibration, the transceiver array 101 amplifies and then filters power levels of the N branches of electric radio frequency transmission calibration signals respectively.

Here in the process of transmitting calibration, the transceiver array 101 performs low-noise amplification processing on the electric radio frequency transmission calibration signal received through the primary calibration receiving channel, amplifies power levels of one banch of low-noise amplified electric radio frequency transmission calibration signals, and converts the amplified electric radio frequency transmission calibration signals into an optical radio frequency transmission calibration signal.

Here in the process of transmitting calibration, the primary calibration receiving channel is selected in such a way that in the process of transmitting calibration, the transmission calibration signal is received through only one of the M calibration channels of the transceiver array, and the remaining (M−1) calibration channels are backup calibration channels, so that when the current primary calibration receiving channel fails, one of the remaining (M−1) calibration channels operates as a new primary calibration receiving channel.

In an implementation, in a process of receiving calibration, the transceiver array 101 converts the received optical radio frequency reception calibration signal into a branch of electric radio frequency reception calibration signal, selects one of the M calibration channels as a primary calibration transmitting channel, amplifies the electric radio frequency reception calibration signal, and then transmits the electric radio frequency reception calibration signal to the radio frequency calibration and test distribution network unit 102 through the primary calibration transmitting channel. The radio frequency calibration and test distribution network unit 102 receives the electric radio frequency reception calibration signal transmitted by the transceiver array 101, splits and directionally couples the electric radio frequency reception test signal into N branches of electric radio frequency reception calibration signals, and transmits the N branches of electric radio frequency reception calibration signals to the transceiver array 101 through the N data channels. The transceiver array 101 receives the N branches of electric radio frequency reception calibration signals transmitted by the radio frequency calibration and test distribution network unit 102 through the N data channels, filters and then amplifies the N branches of electric radio frequency reception calibration signals respectively, converts the amplified N branches of electric radio frequency reception calibration signals into an optical radio frequency reception calibration signal, and transmits the optical radio frequency reception calibration signal obtained as a result of conversion through the optic fiber.

Here in the process of receiving calibration, the transceiver array 101 amplifies power levels of the electric radio frequency reception calibration signals, and transmits the amplified electric radio frequency reception calibration signals to the radio frequency calibration and test distribution network unit 102 through the primary calibration transmitting channel.

Here in the process of receiving calibration, the transceiver array 101 filters the N branches of electric radio frequency reception calibration signals, and then performs low-noise amplification processing on the N branches of electric radio frequency reception calibration signals respectively, amplifies power levels of the low-noise amplified N branches of electric radio frequency reception calibration signals, converts the amplified N branches of electric radio frequency reception calibration signals into an optical radio frequency reception calibration signal, and transmits the optical radio frequency reception calibration signal obtained as a result of conversion through the optic fiber.

Here in the process of receiving calibration, the primary calibration transmitting channel is selected in such a way that in the process of transmitting calibration, the calibration signal is transmitted through only one of the M calibration channels of the transceiver array, and the remaining (M−1) calibration channels are backup calibration channels, so that when the current primary calibration transmitting channel fails, one of the remaining (M−1) calibration channels operates as a new primary calibration transmitting channel.

Figure 2:
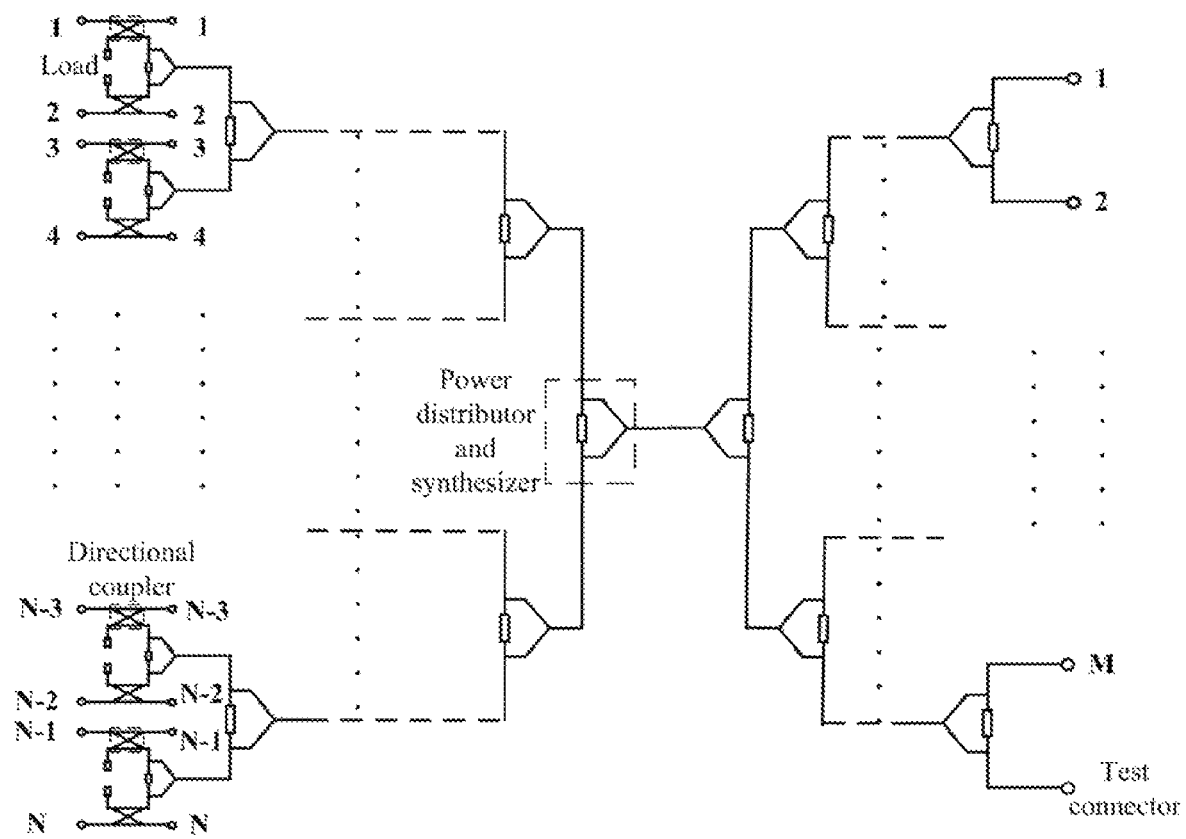
FIG. 2 is a schematic structural diagram of a radio frequency calibration and test distribution network unit according to an embodiment of the invention.

In an implementation, the structure of the radio frequency calibration and test distribution network unit is illustrated in FIG. 2, and the radio frequency calibration and test distribution network unit 102 includes N directional couplers, N loads, and more than one power distributor and synthesizer, where the N directional couplers and the N loads are connected through the power distributor and synthesizers.

Particularly the number of power distributor and synthesizers in the radio frequency calibration and test distribution network unit 102 is $$\sum_{i=1}^{K1} \frac{(2^i)}{2} + \sum_{i=1}^{K2} \frac{(2^i)}{2},$$

where $K1=\log_2(N)$, $K2=\log_2(M+s)$, N is a power of 2, (M+S) is a power of 2, and S represents the number of test connectors.

Here the radio frequency calibration and test distribution network unit includes N Transceiver Array Boundary (TAB) connectors, M calibration connectors, S test connectors, and N antenna element connectors, where the test connectors in the radio frequency calibration and test distribution network unit are the test connectors in the active antenna device.

Here the antenna passive distribution network unit 103 is a passive distribution network with constant amplitude, or a phase shift distribution network. If the antenna passive distribution network unit 103 is a phase shift distribution network, then it can specifically be a manually adjustable phase shift distribution network or an automatically adjustable phase shift distribution network.

Specifically the antenna passive distribution network unit 103 includes N input connectors and P output connectors.

Here the antenna array 104 is formed by arranging uni-polarized antenna elements or dually-polarized antenna elements in a preset array structure. Specifically the antenna array 104 is formed by arranging uni-polarized antenna elements or dually-polarized antenna elements in a planar array, an annular array, or a cylindrical array, and includes P radiation elements, and P connectors.

In an implementation, in the process of transmitting a transmission data signal, the antenna array 104 receives the P branches of electric radio frequency transmission data signals, and the P radiation elements convert the P branches of electric radio frequency transmission data signals into electromagnetic waves, and transmit the electromagnetic waves into a radio space; and the P radiation elements receive electromagnetic waves transmitted in the space, convert the received electromagnetic waves into P branches of electric radio frequency transmission data signals, and output the P branches of electric radio frequency transmission data signals to the antenna passive distribution network unit 103.

Here the test connectors 105 are connected with matching impedances in a non-test state, and connected with test devices in a test state. Specifically in the case that no test is necessary, the test interfaces 105 are connected with the matching impedances, and in the case that there is a test, the matching impedances are removed, and the test connectors 105 are connected with the test devices, e.g., spectrum meters, signal sources, and other test devices.

Figure 3:
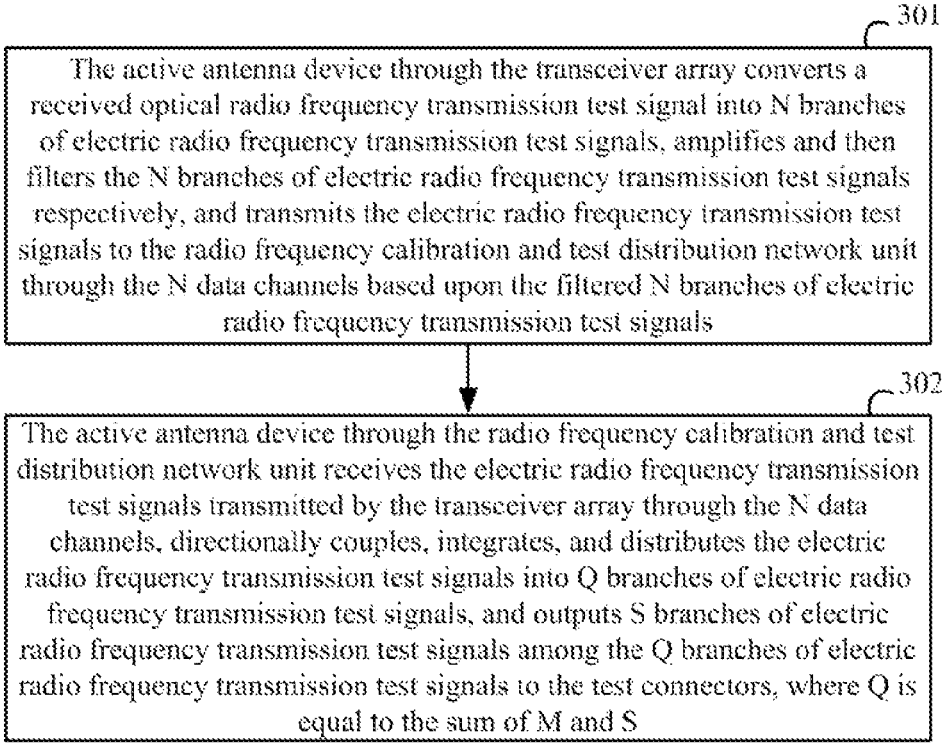
FIG. 3 is a schematic flow chart of a method for testing an active antenna device according to an embodiment of the invention.

An embodiment of the invention further provides a method for testing an active antenna device, and as illustrated in FIG. 3, a flow of the method for testing an active antenna device is as follows.

In the operation 301, the active antenna device converts a received optical radio frequency transmission test signal into N branches of electric radio frequency transmission test signals through the transceiver array, amplifies and then filters the N branches of electric radio frequency transmission test signals respectively, and transmits the electric radio frequency transmission test signals to the radio frequency calibration and test distribution network unit through the N data channels based upon the filtered N branches of electric radio frequency transmission test signals.

In the operation 302, the active antenna device through the radio frequency calibration and test distribution network unit receives the electric radio frequency transmission test signals transmitted by the transceiver array through the N data channels, directionally couples, integrates, and distributes the electric radio frequency transmission test signals into Q branches of electric radio frequency transmission test signals, and outputs S branches of electric radio frequency transmission test signals among the Q branches of electric radio frequency transmission test signals to the test connectors, where Q is equal to the sum of M and S.

Reference can be made to the process above of a conductivity test on characteristics of a transmitter for details of the method for testing an active antenna device according to the embodiment, so a repeated description thereof will be omitted here.

Figure 4:
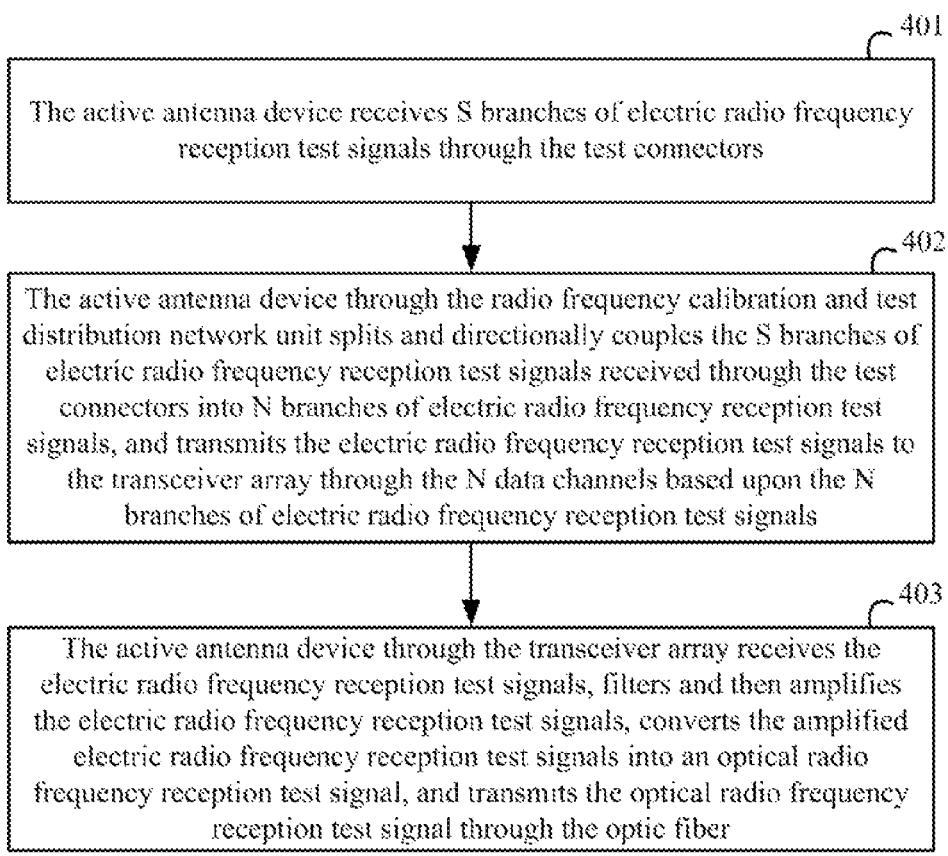
FIG. 4 is a schematic flow chart of another method for testing an active antenna device according to an embodiment of the invention.

An embodiment of the invention further provides another method for testing an active antenna device, and as illustrated in FIG. 4, a flow of the method for testing an active antenna device is as follows.

In the operation 401, the active antenna device receives S branches of electric radio frequency reception test signals through the test connectors.

In the operation 402, the active antenna device through the radio frequency calibration and test distribution network unit splits and directionally couples the S branches of electric radio frequency reception test signals received through the test connectors into N branches of electric radio frequency reception test signals, and transmits the electric radio frequency reception test signals to the transceiver array through the N data channels based upon the N branches of electric radio frequency reception test signals.

In the operation 403, the active antenna device through the transceiver array receives the electric radio frequency reception test signals, filters and then amplifies the electric radio frequency reception test signals, converts the amplified electric radio frequency reception test signals into an optical radio frequency reception test signal, and transmits the optical radio frequency reception test signal through the optic fiber.

Reference can be made to the process above of a conductivity test on characteristics of a receiver for details of the method for testing an active antenna device according to the embodiment, so a repeated description thereof will be omitted here.

With the technical solutions above, in the embodiments of the invention, the calibration channels are provided in the active antenna device through the transceiver array, the radio frequency calibration and test distribution network unit, the antenna passive distribution network unit, the antenna array, and the test connectors to thereby address the problem in the prior art that the large-scale active antenna array without any traditional antenna connectors can not be traditionally tested, so as to test the active antenna device without being limited to any test field, thus avoiding from being limited to a test field or another test condition due to a radiation test, and enabling a conductivity test to be made in a laboratory, or a field where the active antenna device is installed.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:
1. An active antenna device, comprising:
a transceiver array, a radio frequency calibration and test distribution network unit, an antenna passive distribution network unit, an antenna array, and S test connectors, wherein:
the radio frequency calibration and test distribution network unit is connected with the transceiver array through N data channels and M calibration channels, and connected with the test connectors;
the antenna passive distribution network unit is connected with the radio frequency calibration and test distribution network unit through N data channels, and connected with the antenna array through P data channels;
wherein N is a positive integer more than or equal to 1, M is a positive integer more than or equal to 1, P is a positive integer more than or equal to 1, and S is a positive integer more than or equal to 1;
the transceiver array converts a received optical radio frequency transmission test signal into N branches of electric radio frequency transmission test signals, amplifies and then filters the N branches of electric radio frequency transmission test signals respectively, and transmits the electric radio frequency transmission test signals to the radio frequency calibration and test distribution network unit through the N data channels based upon the filtered N branches of electric radio frequency transmission test signals; and
the radio frequency calibration and test distribution network unit receives the electric radio frequency transmission test signals transmitted by the transceiver array through the N data channels, directionally couples, integrates, and distributes the electric radio frequency transmission test signals into Q branches of electric radio frequency transmission test signals, and outputs S branches of electric radio frequency transmission test signals among the Q branches of electric radio frequency transmission test signals to the test connectors, wherein Q is equal to a sum of M and S;
or,
the radio frequency calibration and test distribution network unit receives the S branches of electric radio frequency reception test signals through the test connectors, splits and directionally couples the S branches of electric radio frequency reception test signals into N branches of electric radio frequency reception test signals, and transmits the electric radio frequency reception test signals to the transceiver array through the N data channels based upon the N branches of electric radio frequency reception test signals; and
the transceiver array receives the electric radio frequency reception test signals through the N data channels, filters and then amplifies the electric radio frequency reception test signals, converts the amplified electric radio frequency reception test signals into an optical radio frequency reception test signal, and transmits the optical radio frequency reception test signal through an optic fiber.

2. The device according to claim 1, wherein the radio frequency calibration and test distribution network unit comprises N directional couplers, N loads, and more than one power distributor and synthesizer, and the N directional couplers and the N loads are connected through the power distributor and synthesizers.

3. The device according to claim 2, wherein a quantity of power distributor and synthesizers in the radio frequency calibration and test distribution network unit is $$\sum_{i=1}^{K1} \frac{(2^i)}{2} + \sum_{i=1}^{K2} \frac{(2^i)}{2},$$

wherein K1=log$_2$(N), K2=log$_2$(M+S), N is a power of 2, and (M+S) is a power of 2.

4. The device according to claim 1, wherein the transceiver array is configured: to select one of the filtered N branches of electric radio frequency transmission test signals, and to transmit the selected one branch of electric radio frequency transmission test signal to the radio frequency calibration and test distribution network unit through corresponding one of the data channels; and the radio frequency calibration and test distribution network unit is configured: to receive the electric radio frequency transmission test signals transmitted by the transceiver array through the one data channel, to directionally couple, integrate, and distribute the one branch of electric radio frequency transmission test signals into the Q branches of electric radio frequency transmission test signals, and to transmit the S branches of electric radio frequency transmission test signals among the Q branches of electric radio frequency transmission test signals to the test connectors;

or, the transceiver array is configured: to transmit the filtered N branches of electric radio frequency transmission test signals to the radio frequency calibration and test distribution network unit through the N data channels; and the radio frequency calibration and test distribution network unit is configured: to receive the N branches of electric radio frequency transmission test signals transmitted by the transceiver array through the N data channels, to directionally couple, integrate, and distribute the N branches of electric radio frequency transmission test signals into the Q branches of electric radio frequency transmission test signals, and to transmit the S branches of electric radio frequency transmission test signals among the Q branches of electric radio frequency transmission test signals to the test connectors.

5. The device according to claim 1, wherein the transceiver array is configured:

to select one of the received N branches of electric radio frequency reception test signals, to filter and then amplify the received one branch of electric radio frequency reception test signals, to convert the amplified one branch of electric radio frequency reception test signals into the optical radio frequency reception test signal, and to transmit the optical radio frequency reception test signal through the optic fiber; or to receive the N branches of electric radio frequency reception test signals, to filter and then amplify the N branches of electric radio frequency reception test signals respectively, to convert the amplified N branches of electric radio frequency reception test signals into the optical radio frequency reception test signal, and to transmit the optical radio frequency reception test signal through the optic fiber.

6. The device according to claim 1, wherein the transceiver array is further configured:

to convert a received optical radio frequency transmission data signal into N branches of electric radio frequency transmission data signals, to amplify and then filter the N branches of electric radio frequency transmission data signals respectively, and to transmit the filtered N branches of electric radio frequency transmission data signals to the radio frequency calibration and test distribution network unit through the N data channels;

the radio frequency calibration and test distribution network unit is further configured:

to receive the N branches of electric radio frequency transmission data signals transmitted by the transceiver array through the N data channels, and to transmit the N branches of electric radio frequency transmission data signals to the antenna passive distribution network unit; and the antenna passive distribution network unit is configured:

to receive the N branches of electric radio frequency transmission data signals transmitted by the radio frequency calibration and test distribution network unit, to convert the N branches of electric radio frequency transmission data signals into P branches of electric radio frequency transmission data signals, and to output the P branches of electric radio frequency transmission data signals to the antenna array.

7. The device according to claim 1, wherein the antenna passive distribution network unit is configured:

to receive P branches of electric radio frequency reception data signals transmitted by the antenna array, to convert the P branches of electric radio frequency reception data signals into N branches of electric radio frequency reception data signals, and to output the N branches of electric radio frequency reception data signals to the radio frequency calibration and test distribution network unit;

the radio frequency calibration and test distribution network unit is further configured:

to receive the N branches of electric radio frequency reception data signals transmitted by the antenna passive distribution network unit, and to output the N branches of electric radio frequency reception data signals to the transceiver array through the N data channels; and the transceiver array is further configured:

to receive the N branches of electric radio frequency reception data signals transmitted by the radio frequency calibration and test distribution network unit through the N data channels, to filter and then amplify the N branches of electric radio frequency reception data signals respectively, to convert the amplified N branches of electric radio frequency reception data signals into an optical radio frequency reception data signal, and to transmit the optical radio frequency reception data signal through the optic fiber.

8. The device according to claim 1, wherein the transceiver array is further configured:

to convert the received optical radio frequency transmission calibration signal into N branches of electric radio frequency transmission calibration signals, to amplify and then filter the N branches of electric radio frequency transmission calibration signals respectively, and to output the filtered N branches of electric radio frequency transmission calibration signals to the radio frequency calibration and test distribution network unit;

the radio frequency calibration and test distribution network unit is further configured:

to receive the N branches of electric radio frequency transmission calibration signals transmitted by the transceiver array through the N data channels, to directionally couple, integrate, and distribute them into Q branches of electric radio frequency transmission calibration signals, to transmit M branches of electric radio frequency transmission calibration signals among the Q branches of electric radio frequency transmission calibration signals to the transceiver array through the M calibration channels, and to output S branches of electric radio frequency transmission calibration signals other than the M branches of electric radio frequency transmission calibration signals among the Q branches of electric radio frequency transmission calibration signals to the test connectors; and the transceiver array is further configured:

to select one of the M calibration channels as a primary calibration receiving channel, to receive the electric radio frequency transmission calibration signals transmitted by the radio frequency calibration and test distribution network unit through the primary calibration receiving channel, to amplify and then convert the electric radio frequency transmission calibration signals into an optical radio frequency transmission calibration signal, and to transmit the optical radio frequency transmission calibration signal obtained as a result of conversion through the optic fiber.

9. The device according to claim 1, wherein the transceiver array is further configured:

to convert a received optical radio frequency reception calibration signal into a branch of electric radio frequency reception calibration signals, to select one of the M calibration channels as a primary calibration transmitting channel, and to amplify the electric radio frequency reception calibration signals, and then transmit the electric radio frequency reception calibration signals to the radio frequency calibration and test distribution network unit through the primary calibration transmitting channel;

the radio frequency calibration and test distribution network unit is further configured:

to receive the electric radio frequency reception calibration signals transmitted by the transceiver array, to split and directly couple the electric radio frequency reception test signals into N branches of electric radio frequency reception calibration signals, and to transmit the N branches of electric radio frequency reception calibration signals to the transceiver array through the N data channels; and the transceiver array is further configured:

to receive the N branches of electric radio frequency reception calibration signals transmitted by the radio frequency calibration and test distribution network unit through the N data channels, to filter and then amplify the N branches of electric radio frequency reception calibration signals respectively, to convert the amplified N branches of electric radio frequency reception calibration signals into an optical radio frequency reception calibration signal, and to transmit the optical radio frequency reception calibration signal obtained as a result of conversion through the optic fiber.

10. The device according to claim 1, wherein the antenna passive distribution network unit is a passive distribution network with constant amplitude, or a phase shift distribution network.

11. The device according to claim 1, wherein the antenna array is formed by arranging uni-polarized antenna elements or dually-polarized antenna elements in a preset array structure.

12. The device according to claim 1, wherein the test connectors are connected with matching impedances in a non-test state, and connected with test devices in a test state.

13. A method for testing an active antenna device, the method comprising:

converting, by the active antenna device through a transceiver array, a received optical radio frequency transmission test signal into N branches of electric radio frequency transmission test signals, amplifying and then filtering the N branches of electric radio frequency transmission test signals respectively, and transmitting the electric radio frequency transmission test signals to a radio frequency calibration and test distribution network unit through N data channels based upon the filtered N branches of electric radio frequency transmission test signals; and receiving, by the active antenna device through the radio frequency calibration and test distribution network unit, the electric radio frequency transmission test signals transmitted by the transceiver array through the N data channels, directionally coupling, integrating, and distributing the electric radio frequency transmission test signals into Q branches of electric radio frequency transmission test signals, and outputting S branches of electric radio frequency transmission test signals among the Q branches of electric radio frequency transmission test signals to test connectors, wherein Q is equal to a sum of M and S;

or, receiving, by the active antenna device, S branches of electric radio frequency reception test signals through test connectors;

splitting and directionally coupling, by the active antenna device through a radio frequency calibration and test distribution network unit, the S branches of electric radio frequency reception test signals received through the test connectors into N branches of electric radio frequency reception test signals, and transmitting the electric radio frequency reception test signals to an transceiver array through N data channels based upon the N branches of electric radio frequency reception test signals; and receiving, by the active antenna device through the transceiver array, the electric radio frequency reception test signals, filtering and then amplifying the electric radio frequency reception test signals, converting the amplified electric radio frequency reception test signals into an optical radio frequency reception test signal, and transmitting the optical radio frequency reception test signal through an optic fiber.

14. The method according to claim 13, wherein the radio frequency calibration and test distribution network unit comprises N directional couplers, N loads, and more than one power distributor and synthesizer, and the N directional couplers and the N loads are connected through the power distributor and synthesizers.

15. The method according to claim 14, wherein a quantity of power distributor and synthesizers in the radio frequency calibration and test distribution network unit is $$\sum_{i=1}^{K1} \frac{(2^i)}{2} + \sum_{i=1}^{K2} \frac{(2^i)}{2},$$

wherein K1=log$_2$(N), K2=log$_2$(M+S), N is a power of 2, and (M+S) is a power of 2.

16. The method according to claim 13, wherein the transmitting the electric radio frequency transmission test signals to the radio frequency calibration and test distribution network unit through the N data channels based upon the filtered N branches of electric radio frequency transmission test signals comprises:

selecting one of the filtered N branches of electric radio frequency transmission test signals, and transmitting the selected one branch of electric radio frequency transmission test signals to the radio frequency calibration and test distribution network unit through corresponding one of the data channels; and the receiving, by the radio frequency calibration and test distribution network unit, the electric radio frequency transmission test signals transmitted by the transceiver array through the N data channels, directionally coupling, integrating, and distributing the electric radio frequency transmission test signals into the Q branches of electric radio frequency transmission test signals, and outputting the S branches of electric radio frequency transmission test signals among the Q branches of electric radio frequency transmission test signals to the test connectors comprises:

receiving, by the radio frequency calibration and test distribution network unit, the electric radio frequency transmission test signals transmitted by the transceiver array through the one data channel, directionally coupling, integrating, and distributing the one branch of electric radio frequency transmission test signal into the Q branches of electric radio frequency transmission test signals, and transmitting the S branches of electric radio frequency transmission test signals among the Q branches of electric radio frequency transmission test signals to the test connectors.

17. The method according to claim 13, wherein the transmitting the electric radio frequency transmission test signals to the radio frequency calibration and test distribution network unit through the N data channels based upon the filtered N branches of electric radio frequency transmission test signals comprises:

transmitting the filtered N branches of electric radio frequency transmission test signals to the radio frequency calibration and test distribution network unit through the N data channels; and the receiving, by the radio frequency calibration and test distribution network unit, the electric radio frequency transmission test signals transmitted by the transceiver array through the N data channels, directionally coupling, integrating, and distributing the electric radio frequency transmission test signals into the Q branches of electric radio frequency transmission test signals, and outputting the S branches of electric radio frequency transmission test signals among the Q branches of electric radio frequency transmission test signals to the test connectors comprises:

receiving the N branches of electric radio frequency transmission test signals transmitted by the transceiver array through the N data channels, directionally coupling, integrating, and distributing the N branches of electric radio frequency transmission test signals into the Q branches of electric radio frequency transmission test signals, and transmitting the S branches of electric radio frequency transmission test signals among the Q branches of electric radio frequency transmission test signals to the test connectors.

18. The method according to claim 13, wherein the transmitting the electric radio frequency reception test signals to the transceiver array through the N data channels based upon the N branches of electric radio frequency reception test signals comprises:

selecting one of the received N branches of electric radio frequency reception test signals, filtering and then amplifying the one received electric radio frequency reception test signal, converting the amplified one branch of electric radio frequency reception test signals into the optical radio frequency reception test signal, and transmitting the optical radio frequency reception test signal through the optic fiber; or receiving the N branches of electric radio frequency reception test signals, filtering and then amplifying the N branches of electric radio frequency reception test signals respectively, converting the amplified N branches of electric radio frequency reception test signals into the optical radio frequency reception test signal, and transmitting the optical radio frequency reception test signal through the optic fiber.

19. The method according to claim 13, wherein the method further comprises:

converting, by the active antenna device through the transceiver array, a received optical radio frequency transmission data signal into N branches of electric radio frequency transmission data signals, amplifying and then filtering the N branches of electric radio frequency transmission data signals respectively, and transmitting the filtered N branches of electric radio frequency transmission data signals to the radio frequency calibration and test distribution network unit through the N data channels;

receiving, by the radio frequency calibration and test distribution network unit, the N branches of electric radio frequency transmission data signals transmitted by the transceiver array through the N data channels, and transmitting the N branches of electric radio frequency transmission data signals to the antenna passive distribution network unit; and receiving, by the active antenna device through the antenna passive distribution network unit, the N branches of electric radio frequency transmission data signals transmitted by the radio frequency calibration and test distribution network unit, converting the N branches of electric radio frequency transmission data signals into P branches of electric radio frequency transmission data signals, and outputting the P branches of electric radio frequency transmission data signals to the antenna array.

20. The method according to claim 13, wherein the method further comprises:

receiving, by the active antenna device through the antenna passive distribution network unit, P branches of electric radio frequency reception data signals transmitted by the antenna array, converting the P branches of electric radio frequency reception data signals into N branches of electric radio frequency reception data signals, and outputting the N branches of electric radio frequency reception data signals to the radio frequency calibration and test distribution network unit;

receiving, by the active antenna device through the radio frequency calibration and test distribution network unit, the N branches of electric radio frequency reception data signals transmitted by the antenna passive distribution network unit, and outputting the N branches of electric radio frequency reception data signals to the transceiver array through the N data channels; and receiving, by the transceiver array, the N branches of electric radio frequency reception data signals transmitted by the radio frequency calibration and test distribution network unit through the N data channels, filtering and then amplifying the N branches of electric radio frequency reception data signals respectively, converting the amplified N branches of electric radio frequency reception data signals into an optical radio frequency reception data signal, and transmitting the optical radio frequency reception data signal through the optic fiber.

21. The method according to claim 13, wherein the method further comprises:

converting, by the active antenna device through the transceiver array, the received optical radio frequency transmission calibration signal into N branches of electric radio frequency transmission calibration signals, amplifying and then filtering the N branches of electric radio frequency transmission calibration signals respectively, and outputting the filtered N branches of electric radio frequency transmission calibration signals to the radio frequency calibration and test distribution network unit;

receiving, by the radio frequency calibration and test distribution network unit, the N branches of electric radio frequency transmission calibration signals transmitted by the transceiver array through the N data channels, directionally coupling, integrating, and distributing them into Q branches of electric radio frequency transmission calibration signals, transmitting M branches of electric radio frequency transmission calibration signals among the Q branches of electric radio frequency transmission calibration signals to the transceiver array through the M calibration channels, and outputting S branches of electric radio frequency transmission calibration signals other than the M branches of electric radio frequency transmission calibration signals among the Q branches of electric radio frequency transmission calibration signals to the test connectors; and selecting, by the active antenna device through the transceiver array, one of the M calibration channels as a primary calibration receiving channel, receiving the electric radio frequency transmission calibration signals transmitted by the radio frequency calibration and test distribution network unit through the primary calibration receiving channel, amplifying and then converting the electric radio frequency transmission calibration signal into an optical radio frequency transmission calibration signal, and transmitting the optical radio frequency transmission calibration signal obtained as a result of conversion through the optic fiber.

22. The method according to claim 13, wherein the method further comprises:

converting, by the active antenna device through the transceiver array, a received optical radio frequency reception calibration signal into a branch of electric radio frequency reception calibration signals, selecting one of the M calibration channels as a primary calibration transmitting channel, amplifying the electric radio frequency reception calibration signals, and then transmitting the electric radio frequency reception calibration signals to the radio frequency calibration and test distribution network unit through the primary calibration transmitting channel;

receiving, by the active antenna device through the radio frequency calibration and test distribution network unit, the electric radio frequency reception calibration signal transmitted by the transceiver array, splitting and directionally coupling the electric radio frequency reception test signal into N branches of electric radio frequency reception calibration signals, and transmitting the N branches of electric radio frequency reception calibration signals to the transceiver array through the N data channels; and receiving, by the active antenna device through the transceiver array, the N branches of electric radio frequency reception calibration signals transmitted by the radio frequency calibration and test distribution network unit through the N data channels, filtering and then amplifying the N branches of electric radio frequency reception calibration signals respectively, converting the amplified N branches of electric radio frequency reception calibration signals into an optical radio frequency reception calibration signal, and transmitting the optical radio frequency reception calibration signal obtained as a result of conversion through the optic fiber.

23. The method according to claim 13, wherein the antenna passive distribution network unit is a passive distribution network with constant amplitude, or a phase shift distribution network.

24. The method according to claim 13, wherein the antenna array is formed by arranging uni-polarized antenna elements or dually-polarized antenna elements in a preset array structure.

25. The method according to claim 13, wherein the test connectors are connected with matching impedances in a non-test state, and connected with test devices in a test state.

* * * * *